(12) United States Patent
Nishiyama

(10) Patent No.: US 7,505,265 B2
(45) Date of Patent: Mar. 17, 2009

(54) DOCKING DEVICE HAVING A HOOK TO BE ENGAGED WITH AN ELECTRONIC APPARATUS

(75) Inventor: Shigeki Nishiyama, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 11/698,028

(22) Filed: Jan. 26, 2007

(65) Prior Publication Data
US 2007/0177347 A1 Aug. 2, 2007

(30) Foreign Application Priority Data
Jan. 31, 2006 (JP) .............................. 2006-023870

(51) Int. Cl.
*G06F 1/16* (2006.01)
(52) U.S. Cl. ..................................... 361/686
(58) Field of Classification Search .................. 361/686
See application file for complete search history.

(56) References Cited

U.S. PATENT DOCUMENTS

| 5,694,292 | A | * | 12/1997 | Paulsel et al. ............... 361/686 |
| 5,933,321 | A | * | 8/1999 | Ruch et al. ................... 361/686 |
| 5,948,074 | A | | 9/1999 | Ninomiya |
| 6,135,801 | A | | 10/2000 | Helot et al. |
| 6,353,536 | B1 | * | 3/2002 | Nakamura et al. .......... 361/686 |
| 6,744,627 | B2 | * | 6/2004 | Won et al. .................... 361/686 |
| 2005/0128687 | A1 | * | 6/2005 | Liang et al. .................. 361/679 |

FOREIGN PATENT DOCUMENTS

| JP | 09-282048 | 10/1997 |
| JP | 2000-010658 | 1/2000 |

* cited by examiner

*Primary Examiner*—Lisa Lea-Edmonds
(74) *Attorney, Agent, or Firm*—Pillsbury Winthrop Shaw Pittman, LLP

(57) ABSTRACT

According to one embodiment, a docking device has a main body, which includes a surface facing an electronic apparatus. A hook, which is removably engaged with the electronic apparatus, and a to-be-broken portion are provided on the surface of the main body. The to-be-broken portion interferes with and is broken by the hook, when the hook is moved away from the surface as the electronic apparatus is moved.

14 Claims, 8 Drawing Sheets

DOCKING DEVICE HAVING A HOOK TO BE ENGAGED WITH AN ELECTRONIC APPARATUS

CROSS-REFERENCE TO RELATED APPLICATIONS

This application is based upon and claims the benefit of priority from Japanese Patent Application No. 2006-023870, filed Jan. 31, 2006, the entire contents of which are incorporated herein by reference.

BACKGROUND

1. Field

One embodiment of the invention relates to a docking device for use in connecting an electronic apparatus, such as a portable computer, to a peripheral device. More specifically, the embodiment of the invention relates to a structure to indicate whether the electronic apparatus has been willfully disconnected from the docking device by unauthorized means.

2. Description of the Related Art

An electronic apparatus, such as a portable computer, is designed to have a thin and compact housing, so that the apparatus can be carried easily. In the compact housing, it is difficult to ensure sufficient space which houses, for example, a multi-drive or a plurality of extension cards.

For the above reason, placing prime importance on the portability, the electronic apparatus may be used in combination with a docking device for feature expansion, when necessary. A conventional docking device comprises a mount surface on which an electronic apparatus is mounted, a docking connector to which the electronic apparatus is removably connected, and a plurality of relay connectors to be connected to various peripheral devices. The relay connector is electrically connected to the docking connector. When the electronic apparatus is mounted on the mount surface and connected to the docking connector, the electronic apparatus is electrically connected to the relay connectors via the docking connector.

A docking device disclosed in Jpn. Pat. Appln. KOKAI Publication No. 2000-10658 comprises a hook and a lever. When the electronic apparatus is mounted on the mount surface, the hook is engaged with the housing of the electronic apparatus and locks the electronic apparatus in its position of the mount surface. The lever functions to pull the electronic apparatus on the mount surface in a direction approaching to the docking connector or push it in a direction away from the docking connector. The electronic apparatus can be connected to or removed from the docking device by operating the lever.

Further, the conventional docking device comprises a lock device which restricts a free operation of the lever. The lock device prevents the electronic apparatus from being pushed in a direction away from the docking connector. As a result, the electronic apparatus is inhibited from being undesirably removed or stolen.

However, if a third person tries to forcibly remove the electronic apparatus locked on the mount surface, the part of the housing of the electronic apparatus which engages with the hook may be deformed or damaged. In that case, the electronic apparatus may be unlocked.

Under those circumstances, the docking device generally shows no signs of the electronic apparatus having been removed by force. Therefore, the user cannot see whether the electronic apparatus is intentionally removed or not.

Moreover, if the electronic apparatus is forcibly removed from the docking device, the top end portion of the hook, a terminal of the docking connector or other portions may be slightly deformed, while nothing appears unusual in the hook or the docking connector.

As a result, for example, when another electronic apparatus is connected to the docking device, the hook may not be properly engaged with the electronic apparatus or the electrical connection between the docking connector and the electronic apparatus may not be maintained. If such a problem arises, time and effort will be required to diagnose the cause of the problem.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to accompanying drawings. In general, according to one embodiment of the invention, a docking device, to which an electronic apparatus is removably connected, comprises a main body which has a surface facing the electronic apparatus; and a hook which is provided on the surface and to be removably engaged with the electronic apparatus. A to-be-broken portion is provided on the surface of the main body. The to-be-broken portion interferes with the hook and is broken by the hook, when the hook is moved away from the surface as the electronic apparatus is moved.

A first embodiment of the present invention will now be described with reference to FIGS. 1 to 8.

Figure 1:
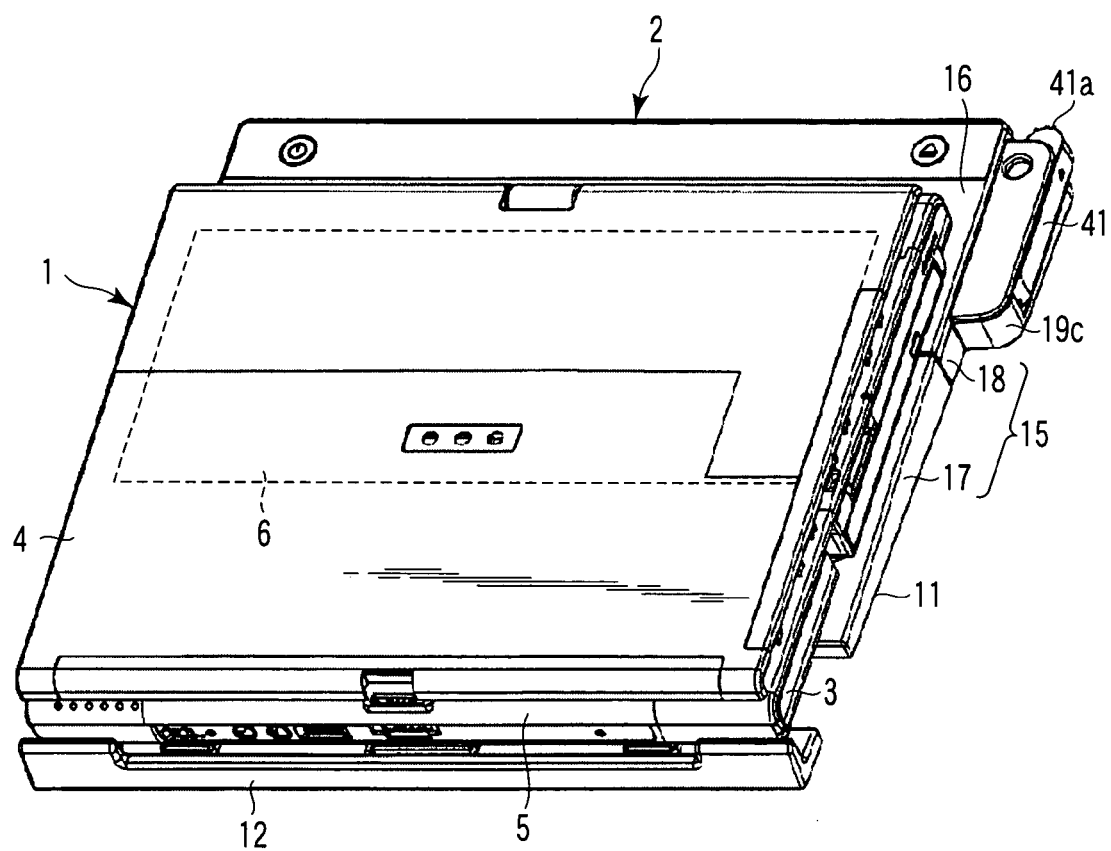
FIG. 1 is an exemplary perspective view showing a state in which a portable computer is connected to a docking station according to a first embodiment of the present invention.

FIG. 1 shows a state in which a portable computer 1 and a docking station 2 are connected to each other.

The portable computer 1 is an example of the electronic apparatus. It comprises a main unit 3 and a display unit 4. The main unit 3 has a housing 5 made of a synthetic resin. The housing 5 is a flat box having a bottom wall 7. A keyboard 6 is supported on an upper surface of the housing 5.

Figure 5:
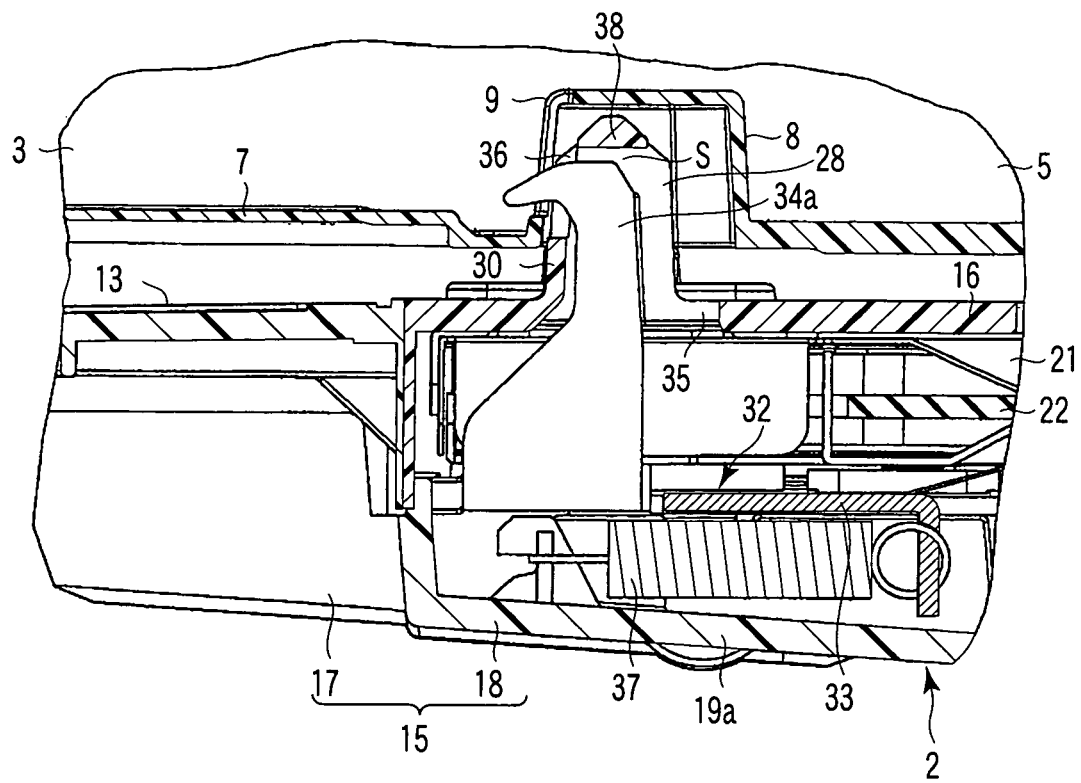
FIG. 5 is an exemplary cross-sectional view showing a state in which the portable computer is connected to the docking station according to the first embodiment.

As shown in FIG. 5, the bottom wall 7 has a pair of recesses 8 (only one of them is shown in FIG. 5). The recesses 8 are spaced apart from each other in the width direction of the housing 5. A slit 9 is formed in a front surface of the recess 8. The slit 9 opens to the interior of the housing 5.

The display unit 4 stores a liquid crystal display panel (not shown). The display unit 4 is supported by a back end portion of the housing 5, and rotatable between a closed position and an open position. FIG. 1 shows a state in which the display unit 4 is in the closed position. In the closed position, the display unit 4 lies over the housing 5 to cover the keyboard 6 from above. In the open position, the display unit 4 stands from the back end portion of the housing 5 to expose the keyboard 6.

Figure 2:
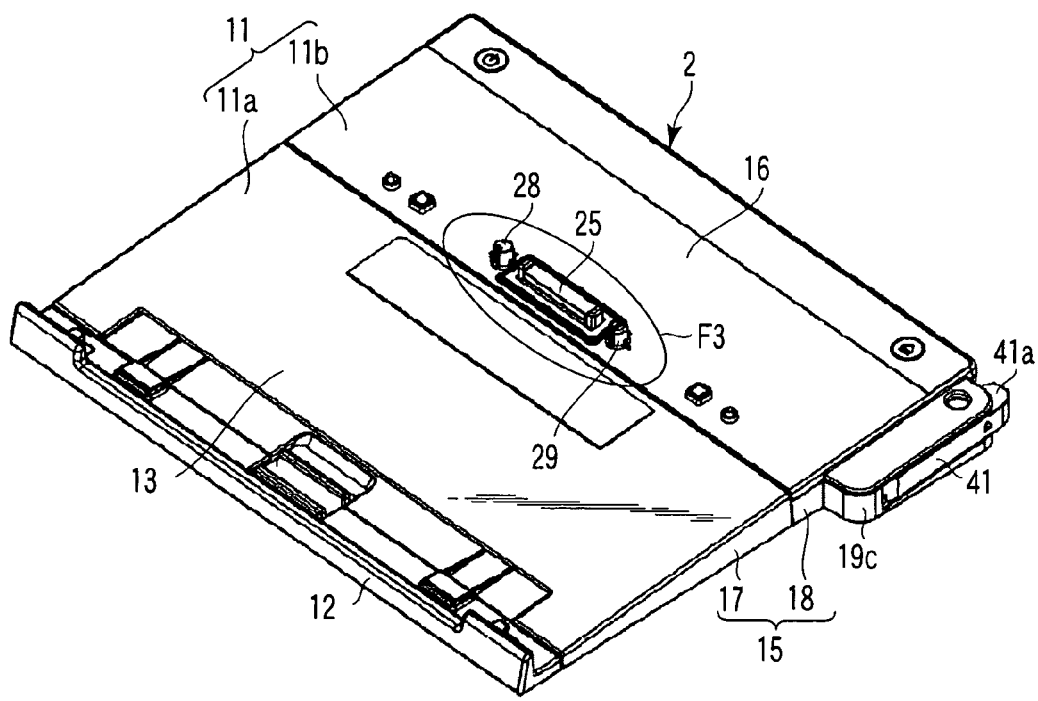
FIG. 2 is an exemplary perspective view of the docking station according to the first embodiment.

The docking station 2 is an example of the docking device. The docking station 2 is used to connect the portable computer 1 to a peripheral device, such as an external keyboard, a printer or an external monitor. As shown in FIG. 2, the docking station 2 comprises a station main body 11 and a front guide 12.

The station main body 11 is a flat box of a size corresponding to the main unit 3 of the portable computer 1. The upper surface of the station main body 11 serves as a mount surface 13, which is flat and on which the main unit 3 is removably mounted. The mount surface 13 is an example of the counter surface and faces the bottom wall 7 of the main unit 3.

The front guide 12, having an elongated plate shape extending in the width direction of the main unit 3, supports the front end of the main unit 3. Left and right side end portions of the front guide 12 are configured to be removably engaged with the front end of the main unit 3. The front guide 12 is extendable from the station main body 11 and supported by the front end portion of the station main body 11, so that it can be adjusted to the size of the main unit 3.

As shown in FIG. 2, the station main body 11 has a front half portion 11a and a back half portion 11b. The front half portion 11a supports the front guide 12. The back half portion 11b is located under the main unit 3, when the main unit 3 is placed on the mount surface 13.

Figure 4:
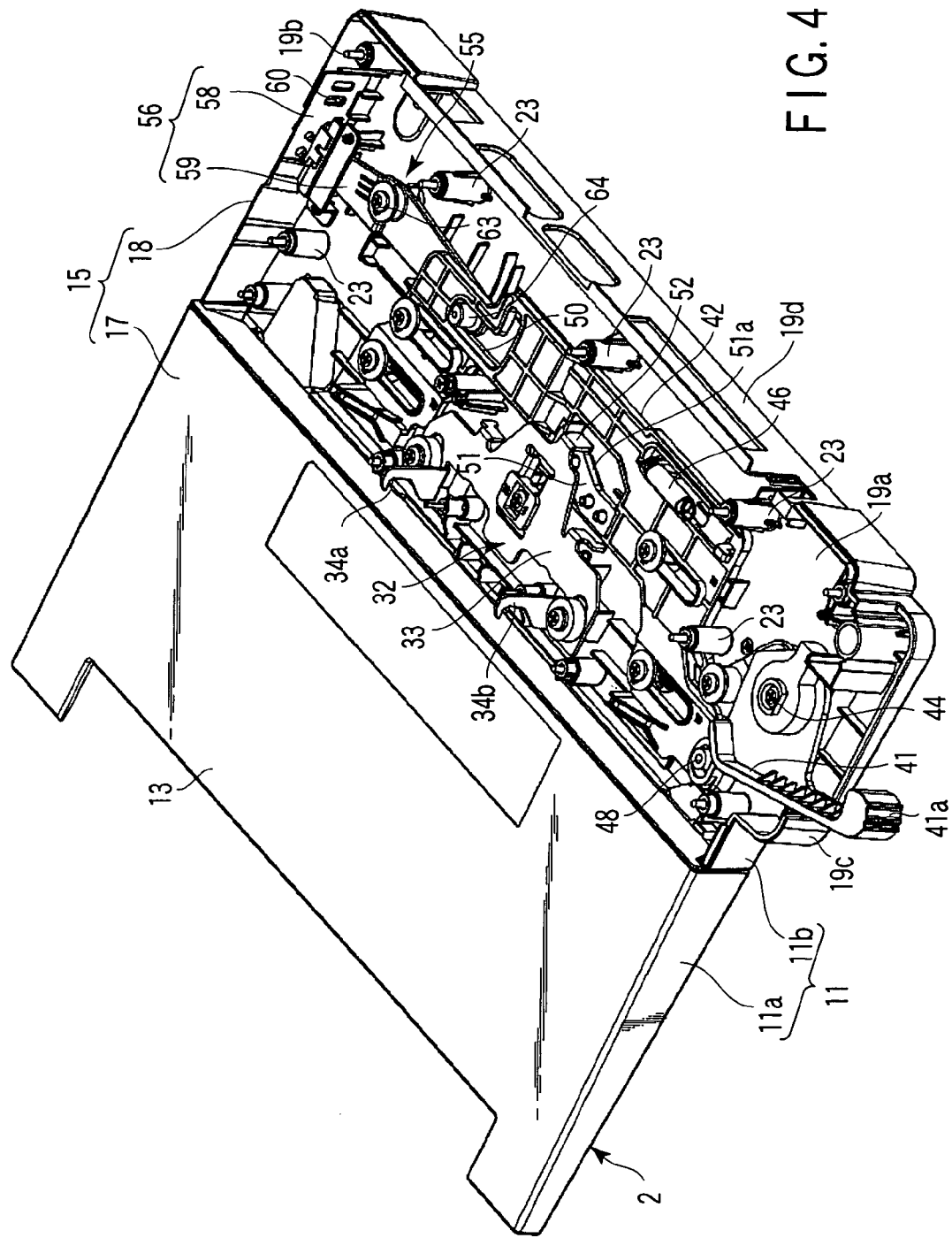
FIG. 4 is an exemplary perspective view of the docking station according to the first embodiment, in a state in which a top cover is removed and a hook and eject mechanism are exposed.

The station main body 11 further comprises a base 15 and a top cover 16. The base 15 and the top cover 16 are made of, for example, a synthetic resin. As shown in FIG. 4, the base 15 has a first portion 17 forming the front half portion 11a of the station main body 11, and a second portion 18 extending backward from the first portion 17. The second portion 18 has a bottom wall 19a, left and right side walls 19b and 19c and a back wall 19d.

The top cover 16 removably covers the second portion 18 of the base 15 from above. The top cover 16, in conjunction with the second portion 18, forms the back half portion 11b of the station main body 11. The upper surface of the top cover 16 forms a part of the mount surface 13.

As shown in FIG. 5, a receptacle 21 is formed between the second portion 18 of the base 15 and the top cover 16. The receptacle 21 houses a printed circuit board 22. The printed circuit board 22 is fixed to a plurality of bosses 23 projecting upward from the bottom wall 19a. The printed circuit board 22 is arranged in parallel to the bottom wall 19a.

Figure 3:
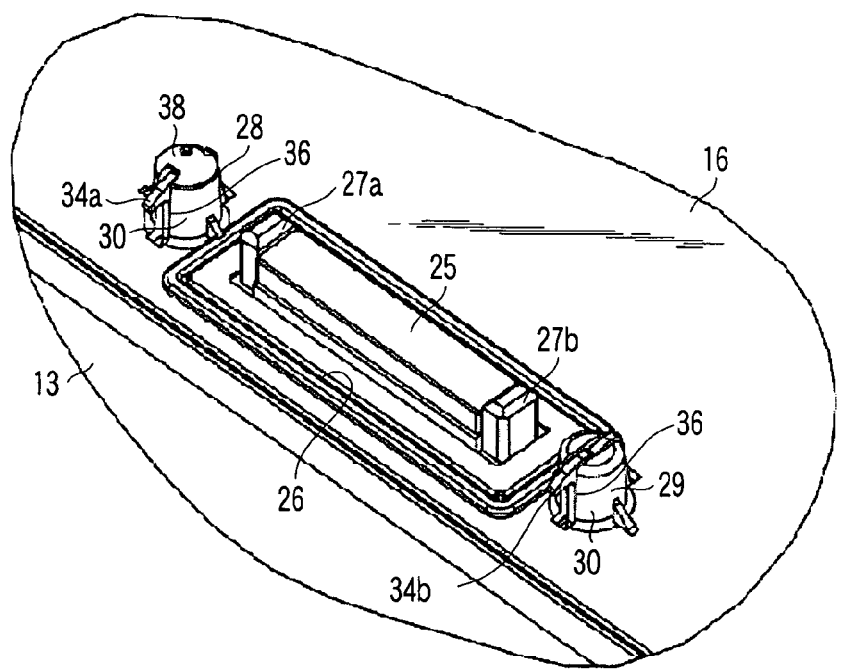
FIG. 3 is an exemplary enlarged perspective view of a portion F3 in FIG. 2.

A plurality of relay connectors (not shown) to connect a peripheral device and the docking connector 25 are mounted on the upper surface of the printed circuit board 22. As shown in FIG. 3, the docking connector 25 projects up through the mount surface 13 via an opening 26 formed in the top cover 16. The docking connector 25 is located in a substantially central portion of the mount surface 13 in the width direction of the mount surface 13. When the housing 5 of the main unit 3 is placed on the mount surface 13, the docking connector 25 is connected to an expansion connector (not shown), which is included in the main unit 3 and exposed through the bottom wall 7 of the housing 5.

The docking connector 25 has a pair of guide projections 27a and 27b. The guide projections 27a and 27b are connected to the expansion connector in advance of the docking connector 25, so that the docking connector 25 can be properly positioned relative to the expansion connector.

As shown in FIGS. 2 and 3, first and second guides 28 and 29 are formed integrally with the mount surface 13 of the station main body 11. The first and second guides 28 and 29 are spaced apart from each other in the width direction of the station main body 11. The docking connector 25 is located between the first guide 28 and the second guide 29.

Each of the first and second guides 28 and 29 comprises a cylindrical portion 30. The cylindrical portion 30 projects upward from the mount surface 13. As shown in FIG. 5, when the housing 5 of the main unit 3 is mounted on the mount surface 13, the cylindrical portions 30 are removably engaged with the recesses 8 of the housing 5. With this engagement, the position of the main unit 3 relative to the mount surface 13 is determined, and the expansion connector of the main unit 3 is properly positioned with respect to the docking connector 25 of the station main body 11.

As shown in FIGS. 4 to 7, the station main body 11 comprises a hook 32 made of metal. The hook 32 is used to lock the main unit 3 in its position on the mount surface 13. The hook 32 has a slide plate 33 and a pair of engaging claws 34a and 34b. The slide plate 33 is supported by the bottom wall 19a and slidable in the depth direction of the station main body 11.

The engaging claws 34a and 34b project upward from a front end portion of the slide plate 33, and are spaced apart from each other in the width direction of the station main body 11. As shown in FIG. 5, the engaging claws 34a and 34b enter the cylindrical portions 30 of the first and second guides 28 and 29 via through holes 35 opened in the top cover 16. Each of the cylindrical portions 30 has a slit-shaped opening 36. The opening 36 passes through the cylindrical portion 30 in the depth direction of the station main body 11, and opens in the circumferential surface of the cylindrical portion 30. The top ends of the engaging claws 34a and 34b are insertable in the openings 36.

The hook 32 is supported by the bottom wall 19a of the station main body 11 so as to be slidable between a first position and a second position. FIG. 5 shows a state in which the hook 32 is located in the first position. In the first position, the top ends of the engaging claws 34a and 34b project forward from the openings 36 toward the front of the station main body 11. In the second position, the top ends of the engaging claws 34a and 34b are retracted in the cylindrical portions 30. The hook 32 is forced to the first position by a pair of tensile coil springs 37.

When the first and second guides 28 and 29 are fit in the recesses 8 of the main unit 3, if the hook 32 is slid from the second position to the first position, the top ends of the engaging claws 34a and 34b of the hook 32 are inserted in the slits 9 of the recesses 8 through the openings 36. Accordingly, the top ends of the engaging claws 34a and 34b engage with the recesses 8 from above. As a result, the main unit 3 is locked in its position on the mount surface 13, and the engagement between the expansion connector and the docking connector 25 is maintained.

According to this embodiment, the direction of the engagement between the expansion connector and the docking connector 25 coincides with the direction of attachment of the main unit 3 relative to the mount surface 13 of the station main body 11. Therefore, the direction of slide of the hook 32 is substantially perpendicular to the direction the attachment of the main unit 3 relative to the mount surface 13. In other words, the engaging claws 34a and 34b of the hook 32 enters the slits 9 of the recesses 8 in a direction substantially perpendicular to the direction of the attachment of the main unit 3 relative to the mount surface 13.

As shown best in FIGS. 3 and 5, the top end of the cylindrical portion 30 of the first guide 28 is closed by an upper wall 38. The upper wall 38 is an example of the to-be-broken portion, and integrated with the cylindrical portion 30 made of a synthetic resin. At least a peripheral part of the upper wall 38 has a thickness smaller than that of the cylindrical portion; that is, it has a lower strength than that of the engaging claw 34a of the hook 32. The upper wall 38 faces the engaging claw 34a with a very small gap S provided therebetween.

Therefore, when the engaging claw 34a is pulled upward above the mount surface 13, the top end of the engaging claw 34a abuts on the upper wall 38.

Figure 6:
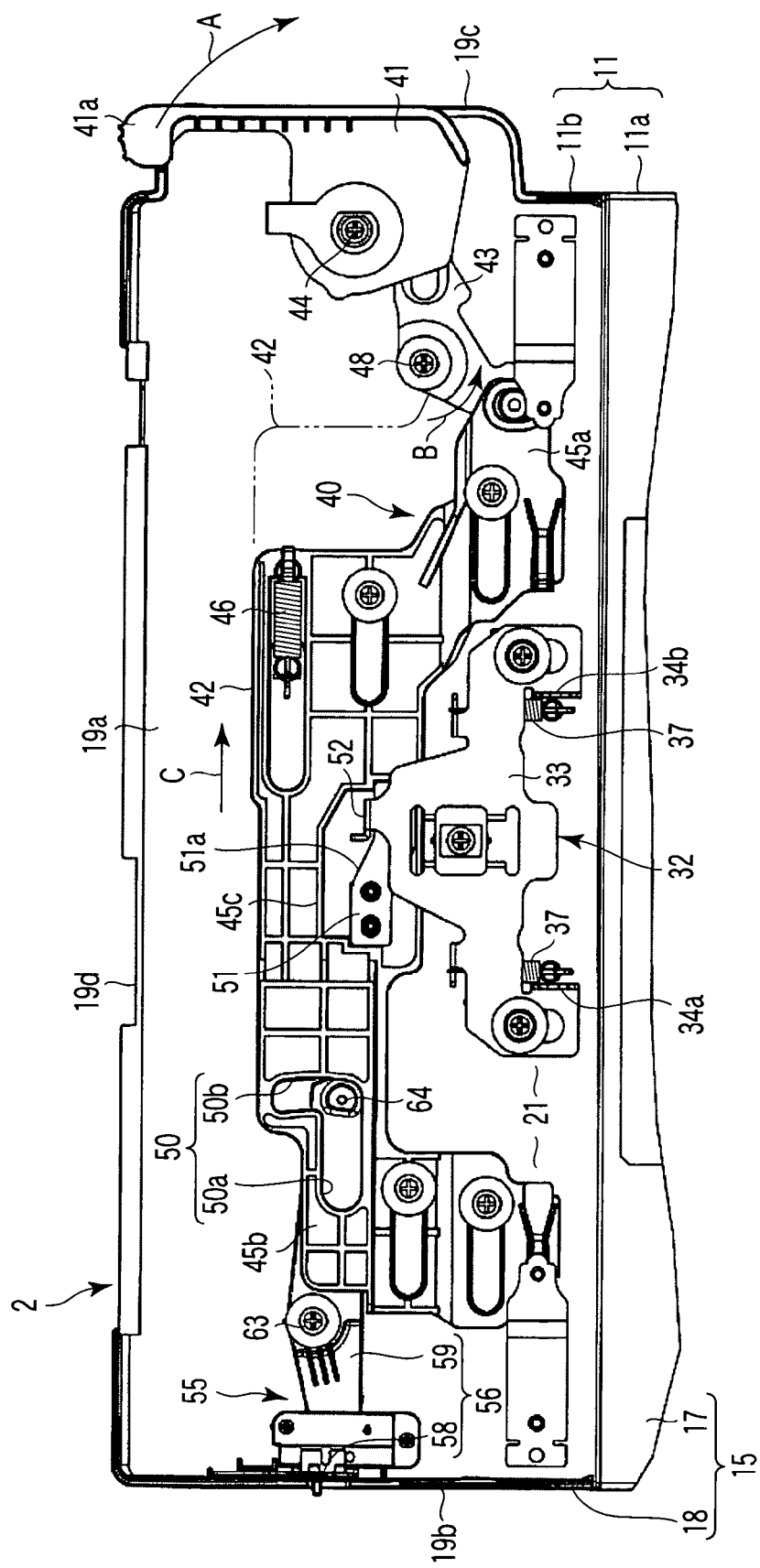
FIG. 6 is an exemplary plan view of the docking station according to the first embodiment, showing the positional relationship among the eject mechanism, the hook and a link mechanism of a lock device.
Figure 7:
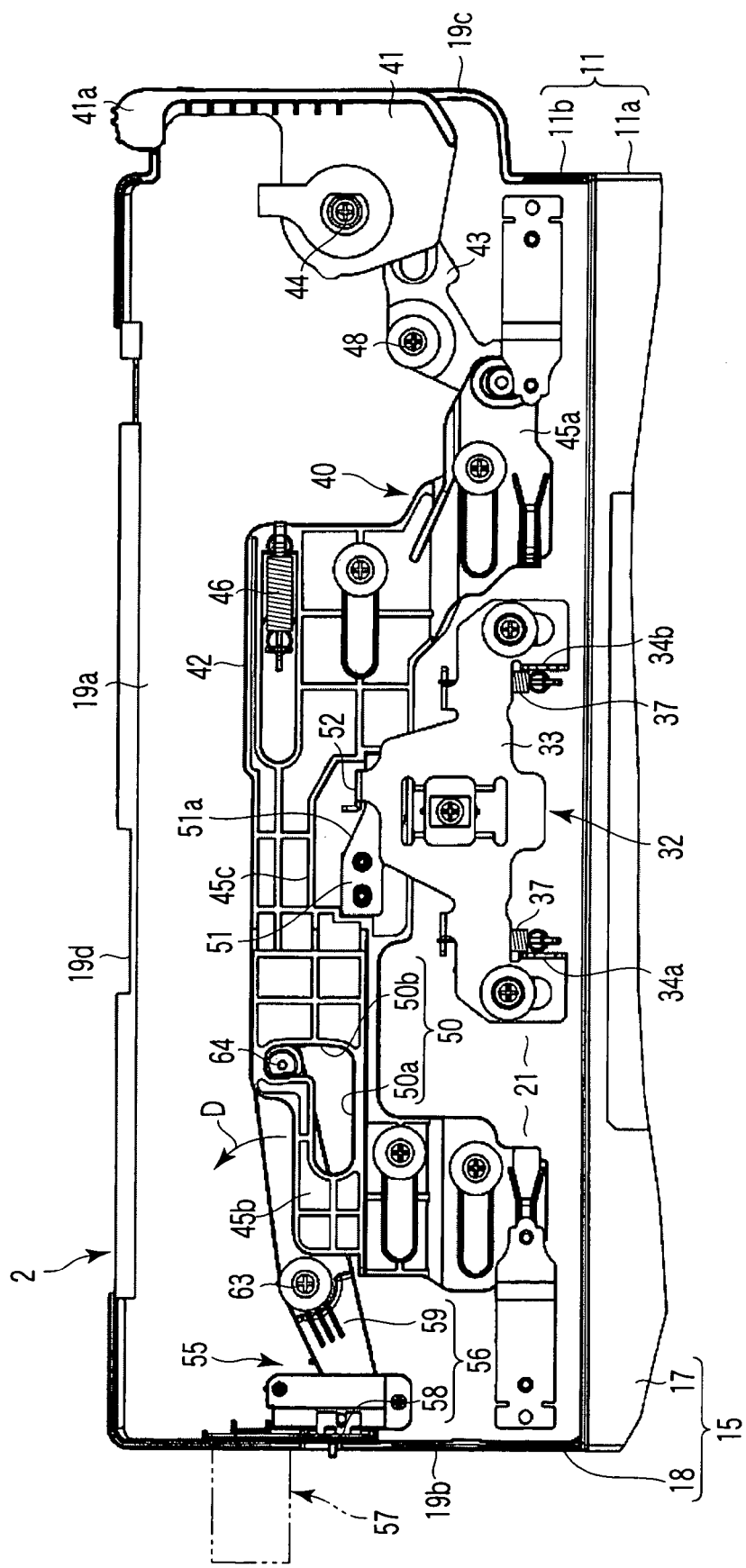
FIG. 7 is an exemplary plan view of the docking station according to the first embodiment, showing a state in which the eject mechanism is locked by a lock device.

As shown in FIGS. 4, 6 and 7, the receptacle 21 of the station main body 11 houses an eject mechanism 40. The eject mechanism 40 forcibly slides the hook 32 from the first position to the second position. The eject mechanism 40 has an eject lever 41, a slider 42 and a relay link 43.

The eject lever 41 is supported by a right end portion of the bottom wall 19a of the base 15 via a pivot 44. The eject lever 41 has a finger-operated portion 41a, on which the operator puts his/her finger tip. The finger-operated portion 41a is exposed outside the station main body 11 through the right side wall 19c of the base 15.

The eject lever 41 is rotatable between a standby position and an eject position. In the standby position, the eject lever 41 is stored in the station main body 11 along the right side wall 19c of the base 15. In the eject position, the finger-operated portion 41a of the eject lever 41 projects outside the side wall 19c, as shown in FIG. 4.

The slider 42 is supported by the bottom wall 19a of the base 15. The slider 42 has an elongated plate shape, extending in the width direction of the station main body 11. The slider 42 has a first end portion 45a, a second end portion 45b and an intermediate portion 45c. The first end portion 45a is adjacent to the eject lever 41. The second end portion 45b is located on the opposite side from the first end portion 45a. The intermediate portion 45c is located between the first end portion 45a and the second end portion 45b.

The slider 42 is slidable between a first slide position and a second slide position in the width direction of the station main body 11. In the first slide position, the slider 42 is located in the left side of the base 15 apart from the eject lever 41. In the second slide position, the slider 42 is located in the right side of the base 15 in proximity to the eject lever 41. In this embodiment, the slider 42 is elastically forced to the first slide position by a tensile coil spring 46.

The relay link 43 is rotatably supported by the bottom wall 19a of the base 15 via a pivot 48. One end of the relay link 43 is rotatably connected to the eject lever 41. The other end of the relay link 43 is rotatably connected to the first end portion 45a of the slider 42.

When the user rotates the eject lever 41 from the standby position to the eject position in the direction of an arrow A shown in FIG. 6, the relay link 43 rotates in the direction of an arrow B. This rotation causes the slider 42 to slide from the first slide position to the second slide position as indicated by an arrow C.

When the user releases the eject lever 41 that has been rotated to the eject position, the slider 42 recovers from the second slide position to the first slide position by the force of the tensile coil spring 46. Accordingly, the eject lever 41 returns from the eject position to the standby position.

A guide groove 50 is formed in the second end portion 45b of the slider 42. The guide groove 50 has a first groove portion 50a and a second groove portion 50b. The first groove portion 50a extends linearly along the slide direction of the slider 52. The second groove portion 50b extends from the right end of the first groove portion 50a in a direction substantially perpendicular to the slide direction of the slider 42.

The intermediate portion 45c of the slider 42 is adjacent to the slide plate 33 of the hook 32. A plate cam 51 is attached to the intermediate portion 45c. The plate cam 51 has an edge 51a extending in the slide direction of the slider 42. The edge 51a is inclined toward the back portion of the slider 42 from the right side to the left side of the slider 42.

The slide plate 33 of the hook 32 has a follower piece 52. The follower piece 52 extends downward from the back end of the slide plate 33, and is slidably in contact with the edge 51a of the plate cam 51. In the state where the slider 42 is in the first slide position as shown in FIG. 6, the follower piece 52 is in contact with the right end of the edge 51a of the plate cam 51. Therefore, the slide plate 33 is held in the first position by the force of the tensile coil springs 37.

When the slider 42 is slid from the first slide position to the second slide position as indicated by a two-dot-chain line in FIG. 6, the follower piece 52 of the slide plate 33 runs on the edge 51a of the plate cam 51. As a result, the slide plate 33 is pressed toward the back portion of the station main body 11 according to the shape of the edge 51a. Consequently, the slide plate 33 is slid from the first position to the second position against the force of the tensile coil springs 37.

As shown in FIG. 7, the docking station 2 includes a lock device 55, which locks the eject mechanism 40. The lock device 55 comprises a link mechanism 56 and a lock cylinder 57, which is called a Kensington lock.

The link mechanism 56 is housed in the receptacle 21 of the station main body 11. The link mechanism 56 has an operation lever 58 and a link lever 59. The operation lever 58 is slidably held by the inner surface of the left side wall 19b of the base 15. The operation lever 58 is slidable between a lock position and an unlock position in the depth direction of the station main body 11. Further, the operation lever 58 has an engagement hole 60 as shown in FIG. 4. When the operation lever 58 is in the lock position, the engagement hole 60 coincides with an insertion hole (not shown) opened in the side wall 19b.

The link lever 59 is rotatably supported by the bottom wall 19a of the base 15 via a pivot 63. One end of the link lever 59 is rotatably connected to the operation lever 58. The other end of the link lever 59 is interposed between the bottom wall 19a of the base 15 and the second end portion 45b of the slider 42. A roller 64 is supported by the other end of the link lever 59. The roller 64 fits in the guide groove 50 of the slider 42.

When the operation lever 58 is in the unlock position as shown in FIG. 6, the link lever 59 extends along the slider 42 in the width direction of the station main body 11. In this state, the roller 64 of the link lever 59 is located in the right end of the first groove portion 50a of the guide groove 50, and kept slidable along the first groove portion 50a.

Thus, the slider 42 of the eject mechanism 40 is freely slidable between the first slide position and the second slide position.

When the operation lever 58 is slid from the unlock position to the lock position, the link lever 59 rotates counterclockwise, as indicated by an arrow D in FIG. 7. This rotation causes the roller 64 of the link lever 59 to move from the first groove portion 50a to the second groove portion 50b in the guide groove 50, and engage with the end of the second groove portion 50b. Since the second groove portion 50b is substantially perpendicular to the slide direction of the slider 42, the roller 64 prevents the slider 42 from sliding.

As a result, the slider 42 of the eject mechanism 40 is locked in the first slide position, and the slide plate 33 of the hook 32 is immovably held in the first position.

Figure 8:
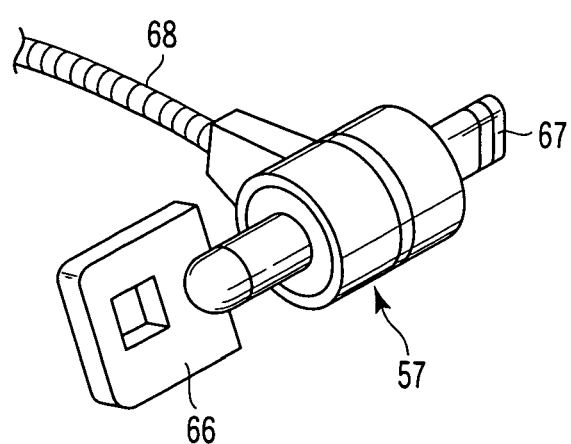
FIG. 8 is an exemplary perspective view of a lock cylinder according to the first embodiment.

As shown in FIG. 8, the lock cylinder 57 has an engagement element 67. The engagement element 67 is operated by a key 66 removably inserted in the lock cylinder 57. When the operation lever 58 is in the lock position, the engagement element 67 is inserted in the engagement hole 60 of the operation lever 58 through the insertion hole of the base 15.

In this state, when the engagement element 67 is rotated 90 degrees by means of the key 66, the engagement element 67 engages with an opening edge of the engagement hole 60. As a result, the lock cylinder 57 is immovably held by the station main body 11 and the operation lever 58 is locked in the lock position.

The lock cylinder 57 has a high-strength cable 68. The docking station 2 is protected from theft by connecting the cable 68 to, for example, a desk on which the docking station 2 is mounted.

Sequences of connecting the portable computer 1 to the docking station 2 will now be described. First, the housing 5 of the main unit 3 is placed on the mount surface 13 over the station main body 11 from above, and the front end of the housing 5 is engaged with the front guide 12.

When the housing 5 is placed on the mount surface 13, the first and second guides 28 and 29 enter the recesses 8 of the housing 5. As a result, the main unit 3 is roughly positioned with respect to the mount surface 13 and the expansion connector of the main unit 3 faces the docking connector 25. In this state, the main unit 3 is pushed into the mount surface 13. Accordingly, the docking connector 25 is fit into the expansion connector.

When the first and second guides 28 and 29 enter the recesses 8 of the housing 5, the top ends of the engaging claws 34a and 34b are engaged with the slits 9 of the recesses 8. As a result, the main unit 3 is locked in its position of the mount surface 13, and the engagement between the expansion connector and the docking connector 25 is maintained. Since the hook 32 is held in the first position by the tensile coil springs 37, the engaging claws 34a and 34b are kept in engagement with the slits 9.

Then, the operation lever 58 of the lock device 55 is slid from the unlock position to the lock position. This slide causes the link lever 59 to rotate counterclockwise as indicated by the arrow D shown in FIG. 7. At the same time, the rotation causes the roller 64 to move from the first groove portion 50a to the second groove portion 50b in the guide groove 50, and engage with the end of the second groove portion 50b.

As a result, the slider 42 is locked in the first slide position. Therefore, the eject lever 41, in conjunction with the slider 42, is maintained in the standby position and the slide plate 33 of the hook 32 is also maintained in the first position.

Thereafter, the operation lever 58 in the lock position is locked by the lock cylinder 57. As a result, the slider 42, the eject lever 41 and the slide plate 33 of the hook 32 are kept in the lock state, and the engaging claws 34a and 34b of the hook 32 are kept engaged with the housing 5 of the main unit 3.

Thus, the main unit 3 is locked on the mount surface 13, and the portable computer 1 cannot be removed from the docking station 2.

If a third person tries to forcibly remove the main unit 3 from the mount surface 13 by an unauthorized act while the portable computer 1 is locked on the mount surface 13, the hook 32, which is engaged with the housing 5, is moved upward together with the housing 5.

During this time, if the parts of the housing 5 with which the engaging claws 34a and 34b engage are deformed or damaged, the lock of the main unit 3 with the engaging claws 34a and 34b will be released and the portable computer 1 may be removed from the mount surface 13.

In other words, even if the portable computer 1 is forcibly removed from the mount surface 13, the engaging claws 34a and 34b of the hook 32 show no signs of the portable computer 1 having been removed by force. In this case, the owner of the portable computer 1 may be puzzled why the portable computer 1 has been removed.

According to the first embodiment described above, when the portable computer 1 is forcibly removed from the mount surface 13 upward in the direction in which the engagement between the expansion connector and the docking connector 25 is released, the engaging claw 34a interfere with the upper wall 38 of the first guide 28. The upper wall 38 is made of synthetic resin having a strength smaller than that of the engaging claw 34a, and the thickness thereof is smaller than that of the cylindrical portion 30. Therefore, when the engaging claw 34a interferes with the upper wall 38, the upper wall 38 is broken.

Thus, if a third person forcibly removes the portable computer 1 from the mount surface 13 by an unauthorized act, the upper wall 38 of the first guide 28 will necessarily be damaged. Therefore, the owner of the portable computer 1 can easily recognize that the portable computer 1 has been removed by an unauthorized act through a watch on the first guide 28. Consequently, he or she can diagnose the cause of the removal of the portable computer 1.

Figure 9:
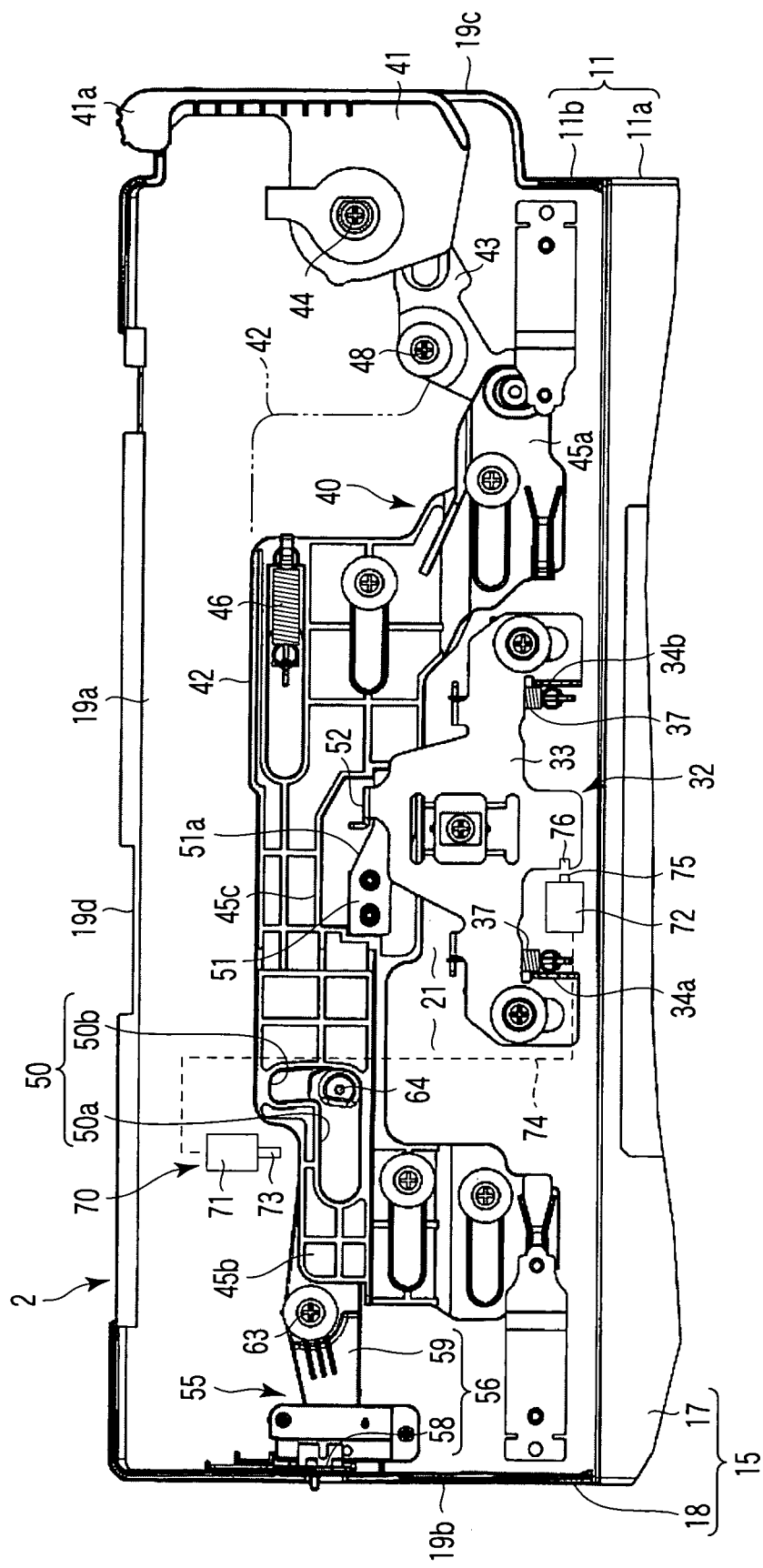
FIG. 9 is an exemplary plan view of a docking station according to a second embodiment of the present invention, showing the positional relationship among an eject mechanism, a hook and a link mechanism of a lock device.
Figure 10:
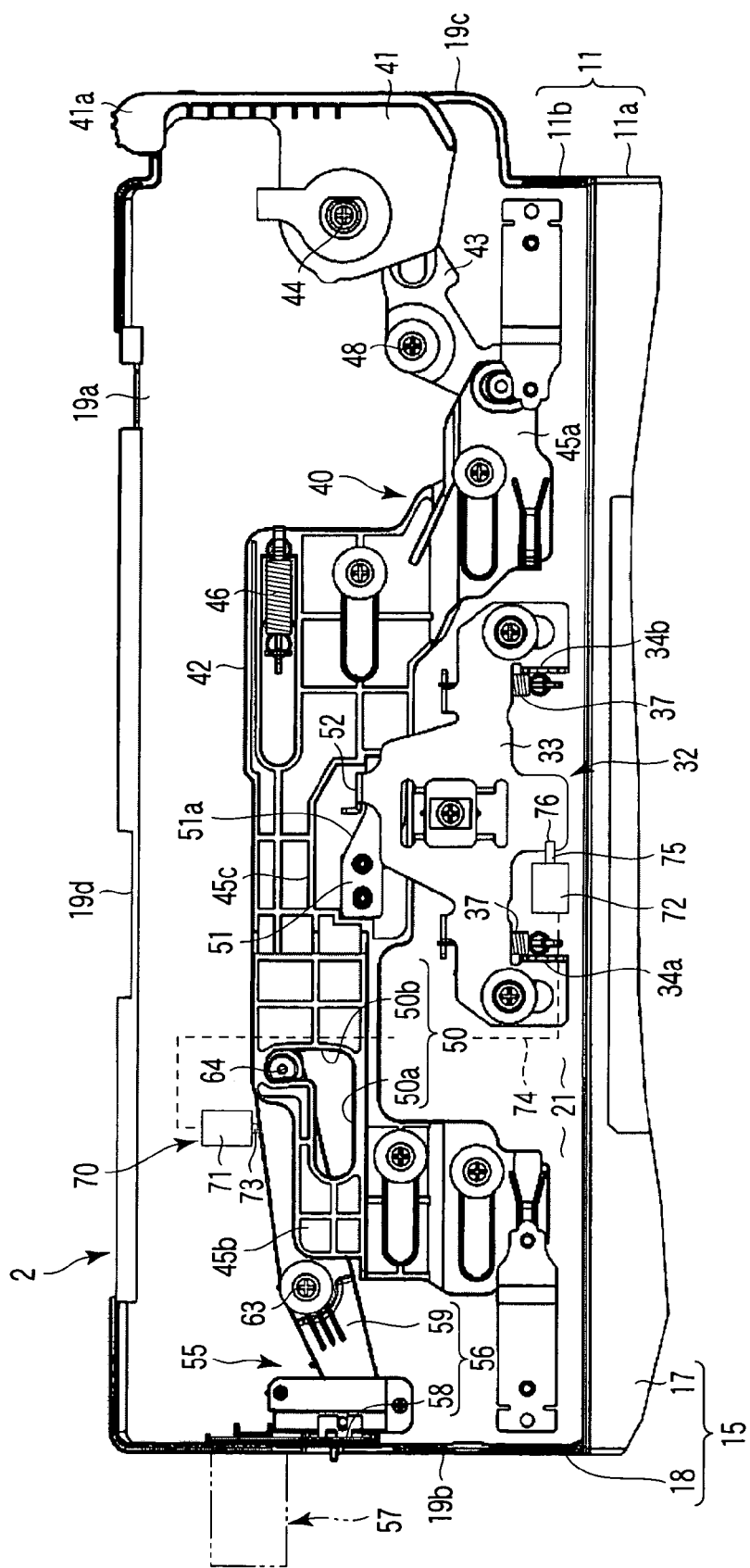
FIG. 10 is an exemplary plan view of the docking station according to the second embodiment, showing a state in which the hook and the eject mechanism are locked by the lock device.

The present invention is not limited to the first embodiment described above. FIGS. 9 and 10 disclose a second embodiment of the present invention.

The second embodiment differs from the first embodiment in that the slide plate 33 of the hook 32 and the eject mechanism 40 can be locked individually. The other parts of the docking station 2 are the same as those of the first embodiment. Therefore, the same components of the second embodiment as those of the first embodiment are identified by the same reference numerals as those used for the first embodiment, and the detailed descriptions thereof are omitted.

As shown in FIG. 9, the docking station 2 comprises a first lock device 55 and a second lock device 70. The first lock device 55 locks the eject mechanism 40 in the first slide position, and has the same configuration as that of the lock device of the first embodiment. The second lock device 70 locks the slide plate 33 of the hook 32 in the first position. The second lock device 70 has a normally-open type microswitch 71 and a solenoid 72. The microswitch 71 and the solenoid 72 are supported by the bottom wall 19a of the base 15.

The microswitch 71 has an actuator 73, which electrically connects and disconnects the contacts of the microswitch 71. The actuator 73 is movable between an ON position, in which it is pushed into the microswitch 71, and an OFF position, in which it projects from the microswitch 71. The distal end of the actuator 73 faces the edge of the link lever 59.

When the operation lever 58 is in the unlock position as shown in FIG. 9, the edge of the link lever 59 is separated from the actuator 73. Therefore, the actuator 73 is in the OFF position, in which the contacts of the microswitch 71 are electrically disconnected from each other.

When the operation lever 58 is slid from the unlock position to the lock position as shown in FIG. 10, the link lever 59 rotates counterclockwise. This rotation brings the edge of the link lever 59 into contact with the distal end of the actuator 73, resulting pushing the actuator 73 into the microswitch 71. Thus, the actuator 73 is brought in the ON position and electrically connects the contacts of the microswitch 71.

The solenoid 72 is electrically connected to the contacts of the microswitch 71. The solenoid 72 has a movable element 75, which is operated by electromagnetic force. The movable element 75 is movable between a disengagement position and an engagement position and faces a recess 76 formed in an edge portion of the slide plate 33. The depth direction of the recess 76 is perpendicular to the direction of movement of the slide plate 33.

When the actuator 73 of the microswitch 71 is in the OFF position, the movable element 75 of the solenoid 72 is in the disengagement position as shown in FIG. 9. In the disengagement position, the movable element 75 of the solenoid 72 is separated from the recess 76 of the slide plate 33. When the actuator 73 of the microswitch 71 is pushed into the ON position, the solenoid 72 is energized. As a result, the movable element 75 projects from the disengagement position to the engagement position as shown in FIG. 10, and fits in the recess 76 of the slide plate 33.

Consequently, free movement of the slide plate 33 is restricted, and the slide plate 33 is locked in the first position.

According to the second embodiment, in the state where the operation lever 58 is locked in the lock position by the lock cylinder 57 as shown in FIG. 10, the movable element 75 of the solenoid 72 locks the slide plate 33 in the first position.

Therefore, the slide plate 33 cannot slide from the first position to the second position. Consequently, the engaging claws 34a and 34b of the hook 32 engaged with the housing 5 cannot be easily disengaged from the housing 5.

In the second embodiment, both the eject mechanism 40 and the slide plate 33 of the hook 32 can be locked by means of the lock cylinder 57. Thus, the security measures are perfect.

However, if a third person forcibly removes the portable computer 1 from the mount surface 13 by excessive force, the housing 5 of the main unit 3 may be deformed or damaged. In this case, the lock of the main unit 3 by the engaging claws 34a and 34b may be released. Therefore, the portable computer 1 may be removed from the mount surface 13 in the same manner as in the first embodiment.

In that case, the owner of the portable computer 1 may be puzzled why the portable computer 1 has been removed, though the security measures are perfect.

According to the second embodiment described above, when the portable computer 1 is forcibly removed from the mount surface 13, the upper wall 38 of the first guide 28 is necessarily broken by the engaging claw 34a. Therefore, the owner of the portable computer 1 can immediately recognize that the portable computer 1 has been removed by an unauthorized act through a watch on the upper wall 38.

In the first embodiment and the second embodiment described above, the upper wall to be broken by the hook is provided in the cylindrical portion of only the first guide. However, the present invention is not limited to these embodiments. For example, upper walls may be provided in the cylindrical portions of both the first and second guides.

Further, in the first embodiment and the second embodiment, the docking connector and the engaging claws of the hook are arranged on the mount surface of the station main body, and the portable computer is attached to the mount surface from above. However, the present invention is not limited to these embodiments. For example, a connector supporting wall that faces the back surface of the portable computer may be formed at the back end of the station main body, and the docking connector and the engaging claws of the hook may be arranged on the connector supporting wall.

With this configuration, the portable computer is pushed in the depth direction of the station main body, and is thereby attached to the station main body. Thus, the direction of the attachment of the portable computer to the station main body is the depth direction (fore-and-aft direction) of the station main body.

Furthermore, in the second embodiment, the hook is locked in the first position by means of the microswitch and the solenoid. However, the present invention is not limited to this embodiment. For example, the hook may be locked in the first position by means of the link mechanism in conjunction with the operation lever.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A docking device to which an electronic apparatus is removably connected, the docking device comprising:
   a main body which includes a surface facing the electronic apparatus;
   a hook which is provided on the surface of the main body and removably engaged with the electronic apparatus; and
   a to-be-broken portion which is provided on the surface of the main body, and interferes with and is broken by the hook, when the hook is moved away from the surface as the electronic apparatus is moved.

2. The docking device according to claim 1, wherein the hook includes an engaging claw exposed on the surface and the to-be-broken portion is provided in a position corresponding to the engaging claw.

3. The docking device according to claim 2, wherein:
   the main body includes a guide, which is removably engaged with the electronic apparatus, thereby positioning the electronic apparatus relative to the surface, the guide including a cylindrical portion projecting from the surface to encircle the engaging claw; and
   the to-be-broken portion is provided at a distal end of the cylindrical portion.

4. The docking device according to claim 3, wherein the to-be-broken portion is made of a synthetic resin and formed integral with the cylindrical portion, and has a strength lower than that of the engaging claw.

5. The docking device according to claim 1, wherein the to-be-broken portion faces the hook along a direction of attachment of the electronic apparatus relative to the main body.

6. The docking device according to claim 1, further comprising a connector, which is provided on the surface of the main body and removably connected to the electronic apparatus.

7. The docking device according to claim 6, wherein:
the hook includes a pair of engaging claws exposed on the surface; and
the to-be-broken portion is provided in a position corresponding to at least one of the engaging claws.

8. The docking device according to claim 7, wherein the connector is located between the engaging claws.

9. The docking device according to claim 1, wherein the hook is supported by the main body so as to be movable between a first position, in which the hook engages with the electronic apparatus, and a second position, in which the hook is separated from the electronic apparatus.

10. The docking device according to claim 9, further comprising an eject mechanism which moves the hook between the first position and the second position.

11. The docking device according to claim 10, further comprising a lock device, which locks the eject mechanism when the hook is in the first position.

12. The docking device according to claim 9, further comprising a first lock device which locks the eject mechanism when the hook is in the first position, and a second lock device which locks the hook in the first position.

13. A docking device to which an electronic apparatus is removably connected, the docking device comprising:
a main body which includes a surface facing the electronic apparatus;
a connector which is provided on the surface of the main body and removably connected to the electronic apparatus;
a hook provided on the surface of the main body and movable between a first position, in which the hook engages with the electronic apparatus, and a second position, in which the hook is separated from the electronic apparatus, the hook locking the electronic apparatus to the surface and maintaining connection between the electronic apparatus and the connector when it is in the first position; and
a to-be-broken portion which is provided on the surface of the main body, and interferes with and is broken by the hook, when the hook is moved away from the surface as the electronic apparatus is moved.

14. The docking device according to claim 13, wherein the to-be-broken portion is made of a synthetic resin and has a strength lower than that of the hook.

* * * * *